(12) United States Patent
Chamberlain et al.

(10) Patent No.: US 7,059,620 B2
(45) Date of Patent: *Jun. 13, 2006

(54) FRAME ASSEMBLY FOR A BICYCLE

(75) Inventors: Jason L. Chamberlain, Morgan Hill, CA (US); Brandon Dale Sloan, Morgan Hill, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/985,356

(22) Filed: Nov. 10, 2004

(65) Prior Publication Data

US 2005/0046144 A1    Mar. 3, 2005

Related U.S. Application Data

(63) Continuation of application No. 10/656,922, filed on Sep. 4, 2003, now Pat. No. 6,880,847.

(60) Provisional application No. 60/473,500, filed on May 27, 2003.

(51) Int. Cl.
*B62K 25/28* (2006.01)
(52) U.S. Cl. ...................................... 280/284; 280/288
(58) Field of Classification Search ........ 280/283–286, 280/288, 281.1
See application file for complete search history.

(56) References Cited

U.S. PATENT DOCUMENTS

| | | | |
|---|---|---|---|
| 4,789,174 A | 12/1988 | Lawwill | |
| 5,121,937 A | 6/1992 | Lawwill | |
| 5,226,674 A | 7/1993 | Buell et al. | |
| 6,170,845 B1 * | 1/2001 | Tseng | 280/284 |
| 6,203,042 B1 | 3/2001 | Wilcox | |
| 6,378,885 B1 * | 4/2002 | Ellsworth et al. | 280/284 |
| 6,471,230 B1 * | 10/2002 | Ellsworth et al. | 280/284 |
| 6,595,538 B1 | 7/2003 | Ellsworth et al. | |
| 6,845,998 B1 * | 1/2005 | Probst | 280/284 |
| 6,854,753 B1 * | 2/2005 | Turner | 280/284 |
| 6,880,847 B1 * | 4/2005 | Chamberlain et al. | 280/284 |
| 2005/0046143 A1 | 3/2005 | Chamberlain | |

OTHER PUBLICATIONS

Cannondale Gemini™ Bicycle Owner's Manual Supplement, IQMc/JCH 122601 #113646, 2001.

(Continued)

*Primary Examiner*—Lesley D. Morris
*Assistant Examiner*—Matthew Luby
(74) *Attorney, Agent, or Firm*—Knobbe, Martens, Olson & Bear, LLP

(57) ABSTRACT

A frame assembly for a bicycle having a front wheel and a rear wheel. The frame assembly preferably includes a main frame and a sub-frame, which is movable relative to the main frame and configured to carry the rear wheel. A shock absorber extends between and is connected to the main frame and the sub-frame. The main frame includes a down tube and a monolithic bottom bracket support. The monolithic bottom bracket support is connected to a rearward end of the down tube and preferably includes an opening configured to support a pedal crank assembly for rotation about a crank axis. Preferably, the shock absorber is connected to the main frame for rotation about a pivot axis positioned forward of the opening of the bottom bracket support. Desirably, the shock absorber pivot axis is positioned forward of a line passing through the crank axis and a center point of the down tube at the junction of the down tube and the head tube. In one arrangement, the monolithic bottom bracket support surrounds a portion of the shock absorber.

6 Claims, 3 Drawing Sheets

OTHER PUBLICATIONS

Cannondale Jekyll™ Owner's Manual Supplement, Publication No. 115808.PDF, Aug. 2003.

Ellsworth Internet Materials, http://www.ellsworthbikes.com/bikes/id/index.cfm dated Nov. 3, 2004 in 5 pages.

Chamberlain, Amendment for U.S. Appl. No. 10/985,261, filed Nov. 10, 2004, dated Mar. 15, 2005 in 9 pages.

Office Action mailed Feb. 25, 2005 in U.S. Appl. No. 10/985,261, filed Nov. 10, 2004.

Interview Summary from U.S. Appl. No. 10/985,261, filed Nov. 10, 2004.

Response to Feb. 25, 2004 Office Action in U.S. Appl. No. 10/985,261, filed Nov. 10, 2004.

Notice of Allowability mailed Apr. 25, 2005 in U.S. Appl. No. 10/985,261, filed Nov. 10, 2004.

* cited by examiner

FRAME ASSEMBLY FOR A BICYCLE

RELATED APPLICATION

This application is a continuation of U.S. patent application Ser. No. 10/656,922, filed Sep. 4, 2003, now U.S. Pat. No. 6,880,847 and also claims priority from Provisional Patent Application No. 60/473,500, filed May 27, 2003.

INCORPORATION BY REFERENCE

The entireties of U.S. patent application Ser. No. 10/656,922, filed Sep. 4, 2003, and Provisional Patent Application No. 60/473,500, filed May 27, 2003, are hereby incorporated by reference herein and made a part of this specification.

BACKGROUND OF THE INVENTION

1. Field of the Invention

The present invention relates generally to bicycles. More particularly, the present invention relates to a bicycle frame including a rear wheel suspension assembly suitable for use in connection with off-road bicycles.

2. Description of the Related Art

Off-road bicycles, or mountain bikes, may be equipped with front and rear suspension assemblies operably positioned between the front and rear wheels, respectively, and the frame of the bicycle. Providing front and rear suspension on a mountain bike potentially improves handling and performance by absorbing bumps, and other rough trail conditions, which may be encountered while riding off-road. As the sport of mountain biking has evolved, the size and difficulty of the obstacles that have become commonplace has increased in scale. As a result, bicycle manufacturers have attempted to continually increase the amount of suspension travel, or the distance that the front and rear wheels may move relative to the frame, of their respective all-purpose mountain bikes.

For comfort, performance and handling reasons, it is desirable to limit the size of a bicycle frame in both longitudinal (lengthwise) and lateral directions. As a result, only a limited amount of space is available before the bicycle becomes too long or too wide. As the amount of suspension travel increases, it becomes more difficult to achieve the performance objectives of the suspension assembly (e.g., isolating pedal and brake forces, providing a desired leverage rate or rate progression, etc.) while also accommodating necessary or desired features or components of the bicycle (e.g., a movable front derailleur, water bottle cages, etc.) within the available space.

One common bicycle rear suspension design involves a single lever, or swingarm, supporting a rear wheel at one end and being pivotally connected to the bicycle frame at the other end. Although such a system is simple and reliable, the single lever, or single pivot, rear suspension design suffers from a relatively large amount of pedal forces and braking forces being transmitted into the rear suspension assembly. Furthermore, in order to provide a large amount of suspension travel, it is necessary to increase the length of the swingarm. Practical constraints, such as limiting the overall length of the bicycle, necessitates placing the pivot for the single lever in a position forward of the pedal crank assembly of the bicycle. As a result, the swingarm typically passes above the pedal crank axis, through a location where the front derailleur would normally be placed. As a result, many single pivot, long travel rear suspension bicycles are prevented from utilizing a front derailleur, which severely limits the number of gear ratios available to the rider.

Rear suspension designs that include multiple lever members and, therefore, multiple pivots, typically exhibit better isolation of pedaling forces and braking forces from the rear suspension. Typically, a multiple lever rear suspension assembly will have a pair of lower arms (i.e., chain stays) pivotally connected to the bicycle frame at a forward end and a link member pivotally mounted to the main frame at a location above the chain stays. A pair of rearward arms (i.e., seat stays) are pivotally connected between rearward ends of the chain stays and link member. The rear wheel may be carried by either of the chain stays or seat stays. Typically, the rear shock absorber is operably positioned between the link member and the main frame. As a result, placement of the shock absorber is at a relatively high position within the bicycle frame, thereby raising the overall center of gravity of the bicycle, which is detrimental to the handling qualities of the bicycle. This drawback is magnified in large suspension travel designs, wherein the size of the rear shock absorber is typically increased.

One proposed solution is to extend a forward end of the link member beyond the seat tube of the main frame and mount the shock absorber in a generally vertical arrangement in front of the seat tube. However, such a design necessitates the use of a long link member, which then must also be increased in size in order to resist bending or torsional forces. The large link member offsets a substantial portion of the lowered center of gravity benefit of the lowered shock position. In addition, the elongated link member increases the lever arm of forces introduced into the suspension assembly through the rear wheel. As a result, a large amount of force is applied to the main frame by the lever, which necessitates enlarging and/or reinforcing the main frame to handle these stresses. In addition, the placement of the shock absorber adjacent the seat tube typically precludes the use of a front derailleur.

SUMMARY OF THE INVENTION

Accordingly, a need exists for an improved rear suspension design especially well suited for use in long travel arrangements, such as those bicycles providing more than about 6 inches of rear suspension travel, for example. Although, preferably, such a rear suspension design would also be well suited for use with bicycles having less than 6 inches of rear suspension travel. Furthermore, it is desirable that the improved rear suspension design is configured to permit the use of a movable front derailleur and, thereby, increase the range of gearing available to the rider. It is also desirable that such a rear suspension design provides a bicycle frame with a low center of gravity and provides good isolation of pedal forces and braking forces from the rear suspension. Preferably, a bicycle frame incorporating a preferred rear suspension assembly includes a monolithic bottom bracket support. A preferred rear suspension assembly desirably achieves one, or more, of these preferred characteristics.

A preferred embodiment is a bicycle including a front wheel, a rear wheel and a frame assembly. The frame assembly includes a main frame and a sub-frame, which is movable relative to the main frame and configured to carry the rear wheel. A shock absorber extends between and is connected to the main frame and the sub-frame. The main frame includes a down tube and a monolithic bottom bracket support. The monolithic bottom bracket support is connected to a rearward end of the down tube and includes an opening configured to support a pedal crank assembly. The monolithic bottom bracket support surrounds a portion of the shock absorber.

A preferred embodiment is a bicycle including a front wheel, a rear wheel and a frame assembly. The frame assembly includes a main frame and a sub-frame, which is movable relative to the main frame and configured to carry the rear wheel. The main frame includes a forged bottom bracket support, which defines an opening configured to support a pedal crank assembly for rotation about a crank axis. The main frame also includes a down tube having a substantially linear intermediate section defining a down tube axis, wherein the down tube axis extends below the crank axis. A shock absorber is connected to and extends between the main frame and the sub-frame. The shock absorber is connected to the main frame for rotation about a pivot axis positioned forward of the opening of the bottom bracket support.

A preferred embodiment is a bicycle including a front wheel, a rear wheel and a frame assembly. The frame assembly includes a main frame and a sub-frame, which is movable relative to the main frame and configured to carry the rear wheel. The main frame includes a head tube, a down tube and a forged bottom bracket support, which defines an opening configured to support a pedal crank assembly for rotation about a crank axis. The down tube is connected to and extends between the head tube and the bottom bracket support. A shock absorber is connected to the main frame at a first location for rotation about a first pivot axis and connected to the sub-frame at a second location. The first pivot axis is positioned forward of a line passing through the crank axis and a center point of the down tube at the junction of the down tube and the head tube.

BRIEF DESCRIPTION OF THE DRAWINGS

These and other features, aspects and advantages of the present invention are described below with reference to drawings of preferred embodiments, that are intended to illustrate, but not to limit, the present invention. The drawings contain five figures.

DETAILED DESCRIPTION OF THE PREFERRED EMBODIMENTS

Figure 1:
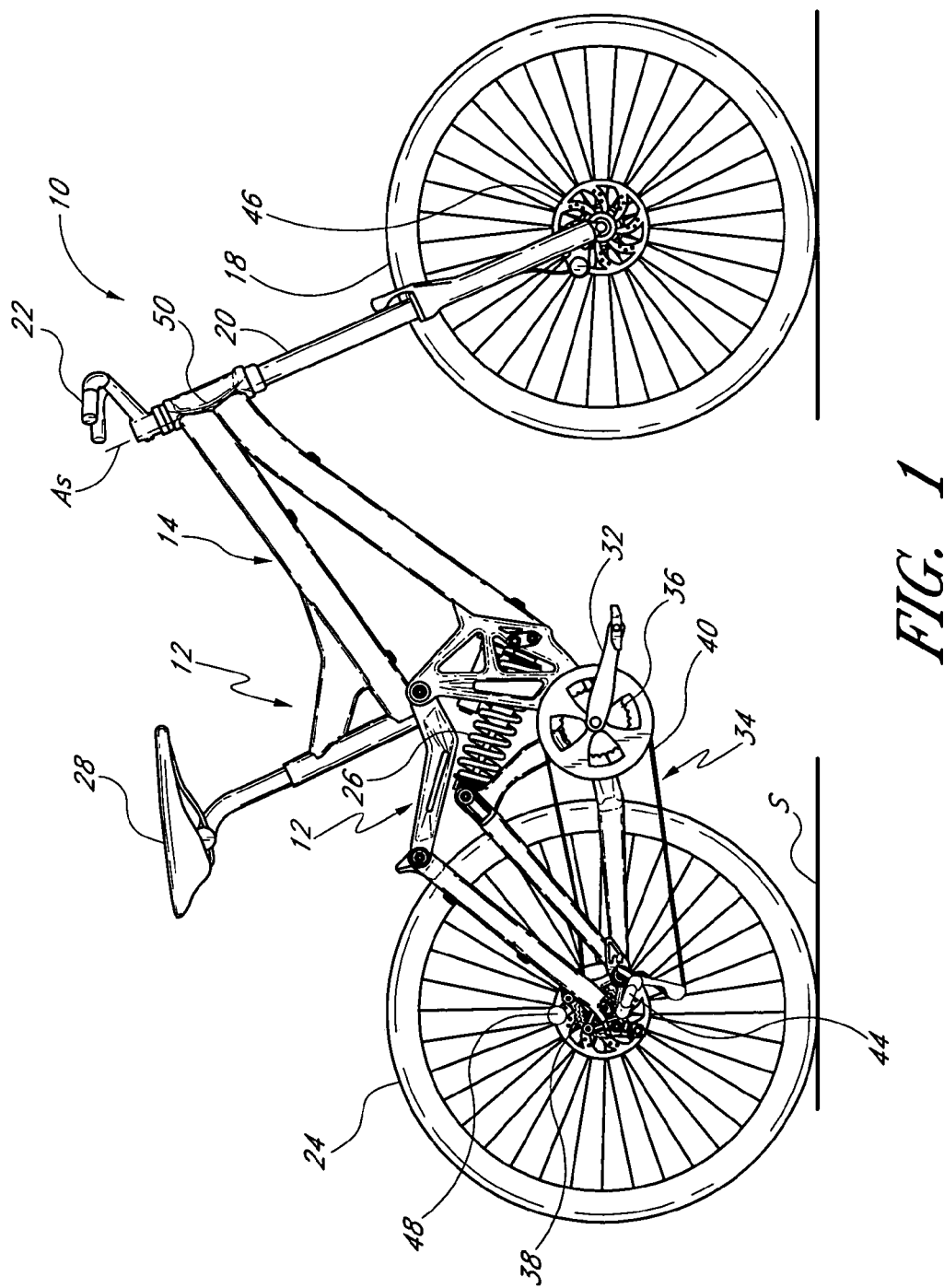
FIG. 1 is a side elevational view of an off-road bicycle, or mountain bike, incorporating a bicycle frame having certain features, aspects and advantages of the present invention.

FIG. 1 illustrates an off-road bicycle, or mountain bike 10, including a preferred rear suspension assembly. The bicycle 10 is described herein with reference to a coordinate system wherein a longitudinal axis extends from a forward end to a rearward end of the bicycle 10. A vertical, central plane generally bisects the bicycle 10 and contains the longitudinal axis. A lateral axis extends normal to the longitudinal axis and lies within a horizontal plane. In addition, relative heights are generally expressed as elevations from a horizontal surface S upon which the bicycle 10 is supported in an upright position. Similarly, relative forward and rearward positions are expressed as distances from a vertical axis, which is normal to the horizontal surface S. The above-described coordinate system is provided for the convenience of describing the embodiment illustrated in FIGS. 1–5, and is not intended to limit the scope of the present invention unless expressly indicated.

The bicycle 10 includes a frame assembly 12 comprised of a main frame 14 and an articulating frame, or sub-frame 16, pivotally supported relative to the main frame 14. The bicycle 10 also includes a front wheel 18 carried by a front suspension assembly, or suspension fork 20. A steerer tube (not shown) is journaled for rotation about a steering axis $A_S$ defined by the main frame 14. A handlebar assembly 22 is connected to an upper end of the suspension fork 20 and is operable to permit a rider of the bicycle 10 to rotate the front wheel 18 about the steering axis $A_S$.

A rear wheel 24 of the bicycle 10 is carried by the subframe 16. A shock absorber 26 is pivotally connected to both the main frame 14 and the subframe 16 to provide resistance to articulating motion of the subframe 16 relative to the main frame 14 and, thus, provide resistance to the suspension travel of the rear wheel 24. A seat assembly 28 is supported above the bicycle frame 12 at a position behind the handlebar assembly 22 and provides support for a rider of the bicycle 10.

A pedal crank assembly 32 is rotatably supported by the bicycle frame 12 and drives a multi-speed chain drive arrangement 34. The multi-speed chain drive arrangement 34 preferably includes a plurality of sprockets, or chain rings 36, rotatably connected to the pedal crank 32. Typically, three chain rings 36 of varying size are mounted to the pedal crank 32. The chain drive arrangement 34 also includes a plurality of sprockets, or cogs 38, drivingly coupled to the rear wheel 24. A drive chain 40 drivingly interconnects a selected chain ring 36 with a selected cog 38 to transfer torque from the pedal crank assembly 32 to the rear wheel 24. Preferably, front and rear derailleurs 42, 44 are supported by the bicycle frame 12 and are configured to move the drive chain 40 to a selected one of the chain rings 36 and rear cogs 38, respectively.

The bicycle 10 also includes front and rear brake systems 46, 48 for slowing and stopping the bicycle 10. Although the illustrated brakes 46, 48 are disc-type brakes, other suitable brake systems may also be used, such as rim-type brakes for example. Rider controls (not shown) are typically provided on the handlebar assembly 22 and are operable to control shifting of the front and rear derailleurs 42, 44 and the front and rear brake systems 46, 48.

Figure 2:
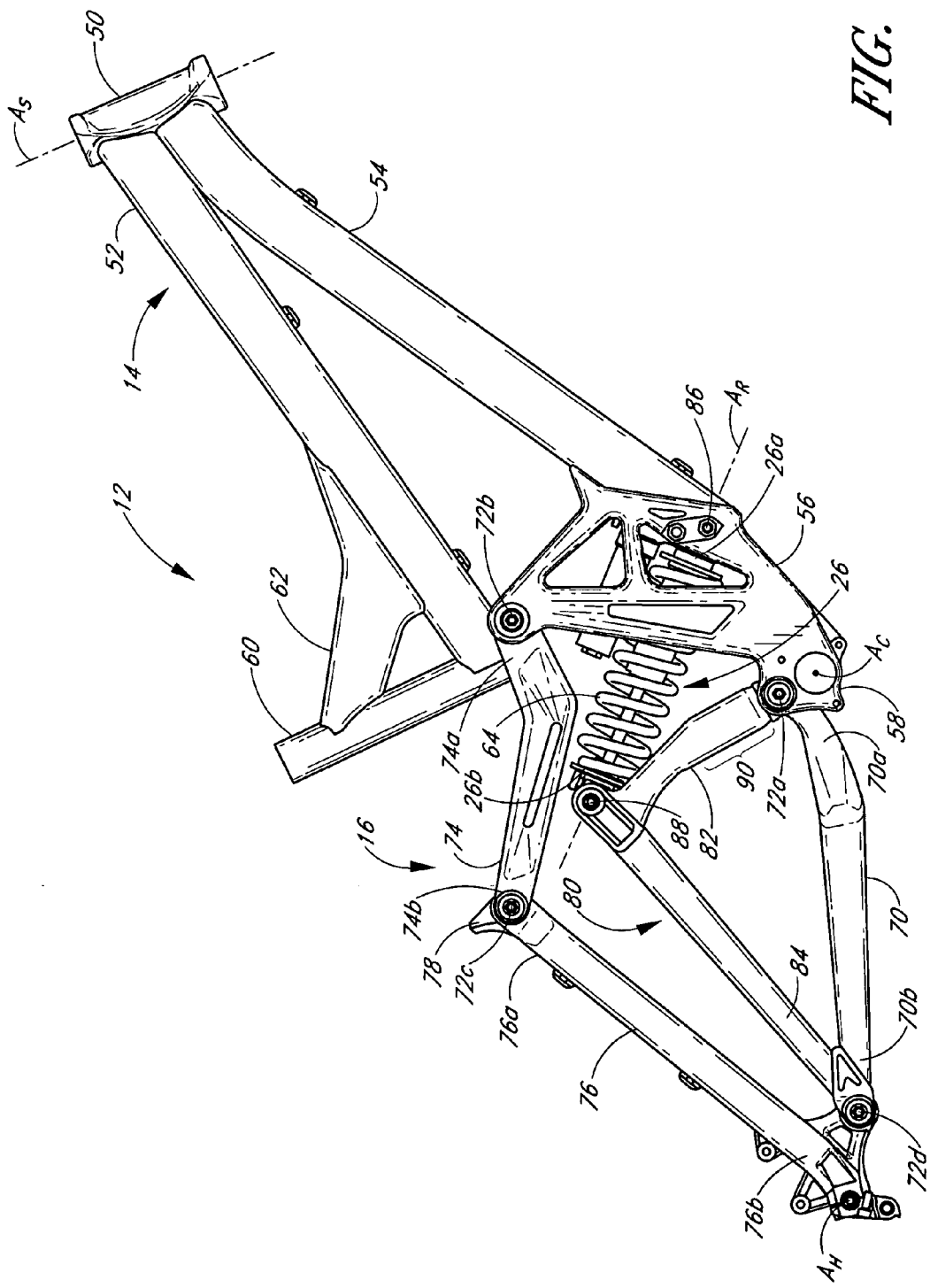
FIG. 2 is a side elevational view of the bicycle frame of FIG. 1 with certain components of the bicycle removed for the purpose of clarity.

With reference to FIG. 2, the bicycle frame 12 and rear shock absorber 26 are illustrated with the remaining components of the bicycle 10 removed for clarity. As described above, preferably, the bicycle frame 12 is primarily comprised of a main frame 14 and an articulating frame, or subframe 16. The main frame 14 includes a head tube 50 which defines the steering axis $A_S$ of the bicycle frame 12. Desirably, the steering axis $A_S$ is canted rearwardly from a vertical axis. The head tube 50 is configured to rotatably support the front suspension 20 and, thus, the front wheel 18 of the bicycle 10.

A top tube 52 and a down tube 54 extend in a rearward direction from the head tube 50 and diverge from one another when moving toward their rearward ends. A bottom bracket support member 56 extends between the rearward ends of the top tube 52 and the down tube 54 and together therewith defines a generally triangular shape. The bottom bracket support member 56 includes a bottom bracket shell 58, which supports the pedal crank assembly 32 (FIG. 1) for rotation about a crank axis $A_C$.

A seat tube 60 extends in an upward direction from a rearward end of the top tube 52 and, preferably, is canted rearwardly from a vertical axis. The seat tube 60 supports the seat assembly 28 shown in FIG. 1. Desirably, a gusset 62 extends from a forward side of the seat tube 60 to an upper side of the top tube 52 to provide additional strength to the seat tube 60.

Preferably, the main frame 14 is constructed of individual components, as described above, which are fabricated from a metal material, such as aluminum or steel, and welded together. Desirably, the bottom bracket support member 56 is created from a metal material by a forging process and, thus, benefits from the strength and durability advantages that inherently result from the forging process. Preferably, the articulating frame 16 and the shock absorber 26 are directly supported by the bottom bracket support member 56, as is described in greater detail below.

However, in alternative embodiment, the main frame 14 may be constructed in a more conventional fashion wherein the forged bottom bracket support member 56 is omitted and the articulating frame 16 and shock absorber 26 may be pivotally connected to the welded-up tubes comprising the main frame 14. Further, other suitable constructions of the main frame 14, including non-triangular constructions, may also be used, such as a monocoque construction, for example. In addition, alternative materials such as composites may also be used in whole or in part to construct the main frame 14, as will readily be appreciated by one of skill in the art. The illustrated embodiment is preferred, however, for at least the reasons discussed herein.

As described above, the illustrated bicycle frame 10 includes a shock absorber 26 operably positioned between the main frame 14 and the subframe 16. Desirably, the shock absorber 26 is configured to provide both a spring force and a damping force in response to relative movement between the subframe 16 and the main frame 14, as is known in the art. The spring force is related to the relative position between the subframe 16 and the main frame 14 while the damping force is related to the relative speed of movement between the subframe 16 and the main frame 14.

Although the illustrated shock absorber 26 incorporates a coil type spring 64, other suitable suspension springs, such as air springs, for example, may also be used. Preferably, the damping system comprises a piston movable within a fluid cylinder of the shock absorber 26. Desirably, the piston forces hydraulic fluid within the fluid chamber through one or more restrictive flow paths to generate a damping force when the shock absorber 26 is both extending and compressing, as is known in the art. In addition, other types of damping arrangements, such as inertia activated and position sensitive arrangements, may also be used, as well be readily understood by one of skilled in the art.

As described above, the subframe 16 is configured to support the rear wheel 24 (FIG. 1) for a movement throughout a suspension travel path relative to the main frame 14 from a relaxed position, substantially as illustrated in FIG. 2, to a compressed position, wherein the subframe 16 is pivoted in an upward direction relative to the main frame 14. Preferably, the subframe 16 is a multiple linkage assembly. That is, preferably, the subframe 16 includes a plurality of linkage members pivotally interconnected with one another. However, in alternative arrangements, a single link member may carry the rear wheel 24 for movement in a simple, arcuate suspension travel path relative to the main frame 14.

In the illustrated arrangement, the subframe 16 includes a chain stay member 70 having a forward end 70a pivotally connected to the main frame 14 for rotation about a pivot axis 72a. Preferably, the chain stay member 70 includes a pair of laterally-space arms that extend in a rearward direction from the forward end 70a and straddle the rear wheel 24 (FIG. 1). However, in an alternative arrangement, the chain stay member 70 may comprise a single arm positioned on one side of the rear wheel 24. Desirably, the chain stay member 70 is connected directly to the main frame 14. However, alternatively, the chain stay member 70 may be connected to the main frame 14 indirectly, such as through an additional link member, for example.

A link member, or lever arm 74, is pivotally connected at a forward end 74a to the main frame 14 for a pivotal motion about a pivot axis 72b. Desirably, the pivot axis 72b is spaced above the pivot axis 72a and, preferably, is positioned proximate a junction between the seat tube 60 and the top tube 52. In the illustrated embodiment, a forward end 74a of the link member 74 includes a pair of arm portions straddling the seat tube 60.

A seat stay member 76 is pivotally supported at an upper end 76a by a rearward end 74b of the link member 74 for pivotal movement about a pivot axis 72c. A lower end 76b of the seat stay member 76 is pivotally supported at a pivot axis 72d defined by a rearward end 70b of the chain stay member 70. Preferably, the seat stay member 76 includes a pair of laterally-spaced arms straddling the rear wheel 24 (FIG. 1) and interconnected by a bridge 78 at the upper end 76a of the seat stay member 76.

A shock support member 80 is fixed for rotation with the chain stay member 70. Thus, any given point on the shock support member 80 rotates through the same angular displacement about the pivot axis 72a as any point on the chain stay member 70. Preferably, the shock support member 80 includes a forward arm 82 and a rearward arm 84. Desirably, the forward arm 82 extends in an upward, and slightly rearward, direction from a forward end 70a of the chain stay member while the rearward arm 84 extends in an upward and forward direction from a rearward end 70b of the chain stay member 70. The forward and rearward arms 82, 84 are joined at their upper ends such that the forward arm 82, the rearward arm 84 and chain stay member 70 form a generally triangular shape when viewed from a side of the bicycle frame 12. Such a triangular arrangement provides a shock support member 80 having an advantageously high strength to weight ratio. However, other suitable arrangements of the shock support member may also be used, such as a single arm, with or without additional supports, such as gussets, for example.

Preferably, the rearward arm member 84 includes a pair of laterally-spaced arm portions configured to straddle the rear wheel 24 (FIG. 1) and being interconnected at their upper ends. Preferably, the forward arm 82 is positioned in front of and generally in the same plane with the rear wheel 24.

Desirably, a front end 26a of the shock absorber 26 is pivotally connected to the main frame 14 and, more specifically, to the bottom bracket support member 56 for rotation about a pivot axis 86. A rearward end 26b of the shock absorber is pivotally connected to the shock support member 80 near a junction of the forward arm 82 and the rearward arm 84 for rotation about a pivot axis 88. Advantageously, the illustrated shock support member 80 positions an rearward end 26b of the shock absorber 26 at a relative position configured to accommodate the rear wheel 24 without requiring an increase in the overall length of the frame. Preferably, the pivot axis 88 of the rearward end 26a of the shock absorber 26 is spaced from the hub axis $A_H$ a radial distance of at least about 26 inches in order to accommodate a rear wheel 24 of a typical diameter. However, the positioning of the pivot axis 88 may also be configured to accept larger wheels. Furthermore, in order to accommodate a shock absorber 26 of a desired length, preferably, the pivot axis 88 is positioned a radial distance from the crank axis $A_C$ of between about 6 and 10 inches and, more preferably, about 8 inches.

In one typical prior art arrangement, the shock absorber 26 is connected to the link member 74 and extends forwardly and upwardly to the main frame 14. In another prior art arrangement, the shock absorber 26 is situated in a substantially vertical orientation in front of the seat tube 60. However, in the presently illustrated arrangement, the forward end 26a of the shock absorber is positioned relatively lower than the rearward end 26b of the shock absorber. Furthermore, the rearward end 26b of the shock absorber 26 is supported by the shock support member 80 at a position below the link member 74. Thus, the shock absorber 26 is mounted at a significantly lower position within the bicycle frame 12 than in the prior art arrangements. Accordingly, the illustrated arrangement provides a significantly lower center of gravity of the bicycle frame 12 than prior art arrangements, which improves handling characteristics of the associated bicycle 10.

As described above, the forward end 26a of the shock absorber 26 is positioned relatively lower than the rearward end 26b. Thus, the pivot axis 86 is positioned relatively lower than the pivot axis 88. Thus, a longitudinal axis of the shock absorber 26 is canted in a downward direction when moving from the rearward end 26b toward the forward end 26a of the shock absorber 26. In addition, preferably, the pivot axis 86 and the pivot axis 88 straddle the crank axis $A_C$. That is, the forward end 26a and forward pivot axis 86 of the shock absorber 26 are positioned forwardly of the crank axis $A_C$ while a rearward end 26b and a rearward pivot axis 88 of the shock absorber 26 are positioned rearwardly of the crank axis $A_C$. Preferably, the forward pivot axis 86 of the shock absorber 26 is positioned between about 4 and 12 inches from the crank axis $A_C$ and, more preferably, between about 5 and 7 inches from the crank axis $A_C$.

Accordingly, with such a construction, a relatively long shock absorber 26 may be accommodated in a relatively low position without resulting in a lengthening of the bicycle frame 12. In a long travel bicycle frame, it is desirable to provide a shock absorber of a relatively increased length in order to retain a desirable ratio between movement of the rear wheel and corresponding movement (i.e., compression or rebound movement) of the shock absorber. If the ratio of wheel movement to shock absorber movement is increased, the force transmitted to the shock absorber is increased, which must be offset by higher spring and damping rates of the shock absorber. The higher spring and damping rates result in a reduction in the ride characteristics of the shock absorber. Thus, the illustrated rear suspension assembly is capable of accommodating a suitably-sized shock absorber 26 in order to maintain a desirable ratio between movement of the rear wheel 24 and movement of the shock absorber 26.

In addition, the illustrated bicycle frame 12 is arranged to achieve the above-described objects without precluding the use of a front derailleur 42 (FIG. 1). The use of a front derailleur 42 has long been a problem with bicycles having a relatively large amount of rear wheel travel due to either the position of the swingarm pivot, in a single pivot arrangement, or due to interference with the chain stay member 70 and/or shock absorber 26 in multi-pivot arrangements.

In the illustrated bicycle frame 12, the pivot axis 72a between the chain stay member 70 and shock support member 80 and the main frame 14 is positioned in a relative close proximity to the crank axis $A_C$. Desirably, the pivot axis 72a is positioned within a radial distance of the crank axis $A_C$ of less than about 3 inches and, more desirably, of less than about 2 inches. Furthermore, the forward arm 82 of the shock support member 80 defines a derailleur mount portion 90 configured to accept the front derailleur 42 (FIG. 1). Thus, the front derailleur 42 is fixed for movement with the subframe 16 and more specifically with the chain stay member 70 and shock support member 80.

Because the pivot axis 72a, about which the shock support member 80 pivots is positioned in relatively close proximity to the crank axis $A_C$, the front derailleur 42 remains in an operable position relative to the chain rings 36 of the pedal crank assembly 32 (FIG. 1) throughout the suspension travel of the subframe 16. Furthermore, common front derailleurs 42 are configured to be positioned in an upper, rearward position relative to the chain rings 36, as illustrated in FIG. 1. Advantageously, because the pivot axis 72a is positioned to a rearward side of the crank axis $A_C$, the front derailleur 42 remains closer to the chain rings 36 than if the swing arm pivot were to be located in front of the crank axis $A_C$, as is common in long travel single pivot bicycle frames.

Preferably, the pivot axes 72a and 72b along with the shock pivot axis 86 are all defined by the bottom bracket support member 56. As described above, desirably the bottom bracket support member 56 is constructed of a monolithic, forged piece of material. Accordingly, the bottom bracket support member 56 may take on a more complex structure than the typical welded together tubes of a conventional bicycle frame. Advantageously, the monolithic bottom bracket support member 56 can be configured to handle the specific loads placed on the main frame 14 by the subframe 16 with a minimum of material, thereby resulting in a wider overall weight of the bicycle frame 12. In addition, due to the high strength of the bottom bracket support member 56, the seat tube 60, top tube 52 and down tube 54 do not have to support the loads placed on the main frame 14 by the subframe 16 and, therefore, can be lighter in weight.

Preferably, the seat stay member 76 supports the rear wheel 24 (FIG. 1) for rotation about a hub axis $A_H$ and, preferably, the hub axis $A_H$ is positioned above the pivot axis 72d defined by the lower end 76b of the seat stay member 76 and the rearward end of the chain stay member. Accordingly, the suspension path of the hub axis $A_H$ is determined primarily by the relative lengths and angles of the link member 74 and the seat stay member 76. Desirably, the hub axis $A_h$ moves through a generally vertical wheel path in order to inhibit pedal forces or braking forces from influencing movement of the rear wheel 24 throughout the suspension travel path. However, in alternative arrangements, the hub axis $A_H$ may move through a more complex, curvilinear wheel path. As described above, the illustrated bicycle frame 12 is well adapted to provide a relatively large amount of rear wheel 24 suspension travel. Preferably, the frame 12 provides at least about 6 inches of vertical movement of the hub axis $A_h$ relative to the main frame 14 and, more specifically, relative to the surface S upon which the bicycle 10 is being ridden. More preferably, the hub axis $A_H$ is configured for at least about 8 inches of vertical movement. As will be readily appreciated by one of skill in the art, the movement of the hub axis $A_H$ is dependent on the overall position of the bicycle 10 and, therefore, may not necessarily be vertical. Herein, the term "vertical" is used in reference to the position of the bicycle 10 illustrated in FIG. 1. The "vertical" movement of the hub axis $A_H$ may also be described as movement substantially normal to the surface S.

Furthermore, in the illustrated bicycle frame 12, the rear shock absorber 26 is actuated by the shock support member 80, which is fixed for rotation with the chain stay member 70. Thus, an existing, relatively long lever arm (i.e., the chain stay member 70) is utilized to actuate the shock absorber 26 and, therefore, primarily influences the rate of progression of the leverage, or mechanical advantage, that the lever arm (chain stay member 70) has in acting on the rear shock absorber 26. Thus, with the preferred arrangement illustrated herein, leverage ratio on the shock absorber 26 is determined primarily by the chain stay member 70 (through the shock support member 80) while the wheel path is primarily determined by the link member 74 and the seat stay 76. Accordingly, each of the leverage ratio and the wheel path characteristics may be optimized.

Figure 3:
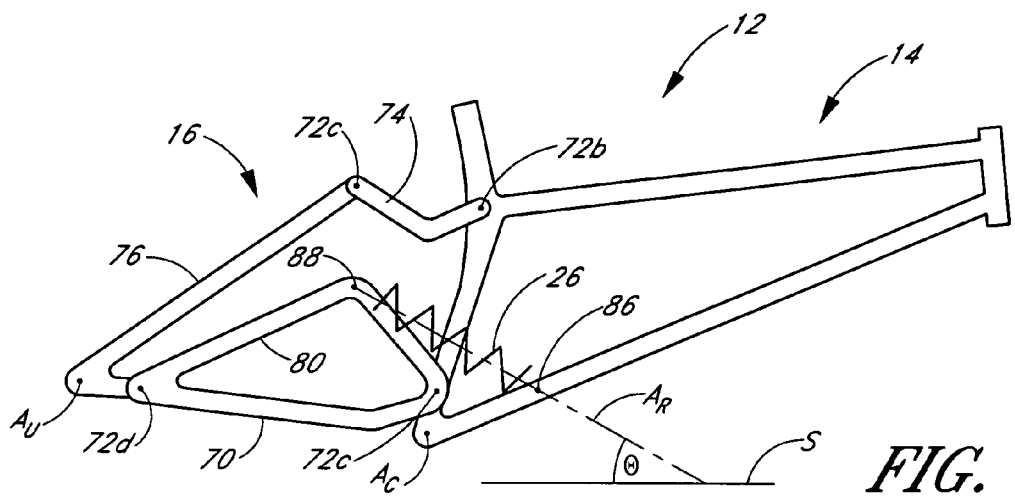
FIG. 3 is a schematic illustration of the bicycle frame of FIG. 1.

FIG. 3 is a schematic illustration of the bicycle frame 12 of FIGS. 1 and 2. FIG. 3 presents a simplified illustration of the members 70, 74, 76, 80 of the subframe 16 in order to enable a comparison with additional preferred embodiments. Preferably, as described above, the hub axis $A_H$ is defined by the seat stay member 76, which is supported relative to the main frame 14 by the link member 74 and the chain stay member 70. In addition, preferably, the shock support member 80 supports the shock absorber 26, along with the main frame 14, such that the longitudinal axis $A_r$ of the shock absorber 26 defines an angle θ of between about 0 degrees and 45 degrees relative to the surface S upon which the bicycle 10 (FIG. 1) rests. More preferably, the angle θ is between about 15 and 25 degrees and, most preferably, is about 20 degrees. As described above, such an arrangement permits the accommodation of a shock absorber 26 of a desirable length and lowers the center of gravity of the frame 12, without increasing the overall length of the frame 12.

Figure 4:
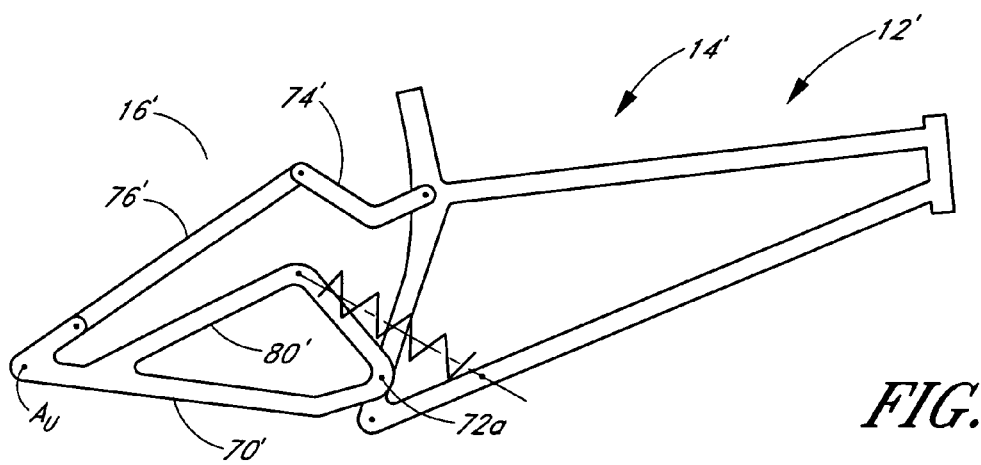
FIG. 4 is a schematic illustration of a modification of the bicycle frame of FIG. 1.

FIG. 4 illustrates a modification of the bicycle frame 12 of FIGS. 1 through 3 and is generally referred to by the reference numeral 12'. The bicycle frame 12' is similar to the bicycle frame 12 of FIGS. 1 through 3 and, therefore, like reference numerals will be used to indicate like components, except that a prime (') has been added.

The bicycle frame 12' is an operable, although less preferred, construction having a main frame 14' and a subframe 16'. The main frame 14', preferably, is substantially similar to the main frame 14 of FIGS. 1 through 3. The subframe 16' is similar to the subframe 16 of FIGS. 1 through 3 with the exception that the hub axis $A_H$ and, thus, the rear wheel are carried by the chain stay member 70', instead of the seat stay member 76'. As a result, the hub axis $A_H$ moves in a simple arcuate path about the chain stay pivot 72a. Such a construction is less effective at isolating pedal forces and braking forces from influencing movement of the subframe 16' relative to the main frame 14'.

Figure 5:
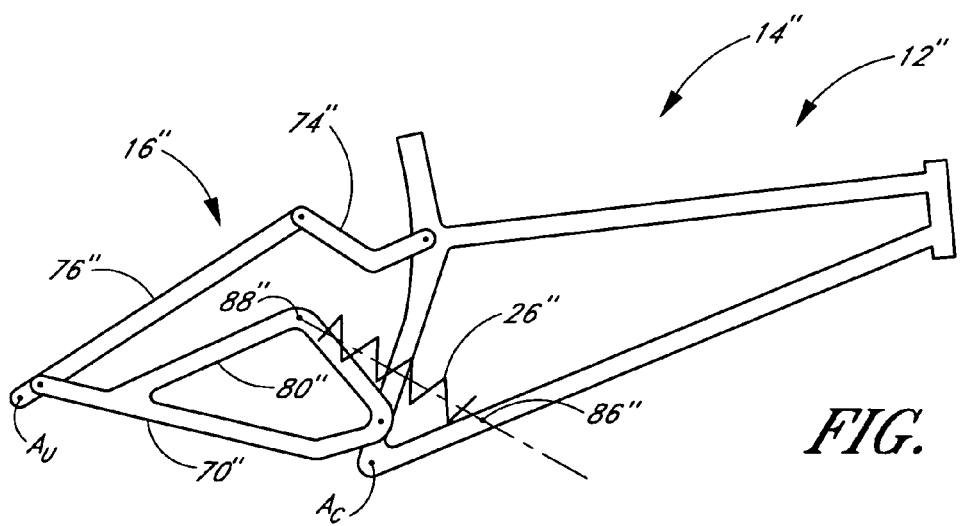
FIG. 5 is a schematic illustration of another modification of the bicycle frame of FIG. 1.

FIG. 5 illustrates yet another modification of the bicycle frame 12 of FIGS. 1 through 3 and is generally referred to by the reference numeral 12". The bicycle frame 12" is similar to the bicycle frame 12 of FIGS. 1 through 3 and, therefore, like reference numerals are used to indicate like components, except that a double prime (") has been added.

The bicycle frame 12" also includes a main frame 14", preferably constructed in a manner similar to the main frame 14, and a subframe 16" supported for movement relative to the main frame 14". The subframe 16" includes a shock support member 80" is fixed for movement with the chain stay member 70", as in the frame 12 of FIGS. 1–3. However, the chain stay member 70" is elongated and connected to the seat stay member 76" at a position above the hub axis $A_H$. As in the frame 12 of FIGS. 1–3, the shock absorber 26" is actuated by the shock support member 80", which is fixed to the chain stay member 70" and the hub axis $A_H$ is defined by the seat stay member 76".

Although the present invention has been disclosed in the context of several preferred embodiments, it will be understood by those of skilled in the art that the scope of the present invention extends beyond the specifically disclosed embodiments to alternative embodiments and/or uses of the invention and obvious modifications and equivalents thereof. Accordingly, the invention is intended to be defined solely by the appended claims.

What is claimed is:

1. A bicycle, comprising:
   a front wheel;
   a rear wheel;
   a frame assembly comprising a main frame and a subframe movable relative to said main frame and configured to carry said rear wheel, said main frame comprising a forged bottom bracket support defining an opening configured to support a pedal crank assembly for rotation about a crank axis, said bottom bracket support comprising a mount portion configured to support said sub-frame for rotation about a mount axis, said main frame further comprising a down tube including a substantially linear intermediate section defining a down tube axis, wherein said down tube axis extends below said crank axis; and
   a shock absorber connected to and extending between said main frame and said sub-frame, said shock absorber connected to said main frame for rotation about a pivot axis positioned forward of said opening of said bottom bracket support.

2. The bicycle of claim 1, wherein said pivot axis is defined by said forged bottom bracket support.

3. The bicycle of claim 1, wherein said sub-frame comprises a multiple linkage assembly.

4. The bicycle of claim 3, wherein said sub-frame comprises a pair of chain stays, a pair of seat stays and a link.

5. The bicycle of claim 4, wherein said seat stays are rotatably coupled to said chain stays.

6. The bicycle of claim 5, wherein said rear wheel is carried by said seat stays.

* * * * *